(12) United States Patent
Agin et al.

(10) Patent No.: US 6,718,162 B1
(45) Date of Patent: Apr. 6, 2004

(54) RECEIVER FOR A CDMA MOBILE RADIOCOMMUNICATION SYSTEM

(75) Inventors: Pascal Agin, Sucy en Brie (FR); Ghislaine Reybet-Degat, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/567,433

(22) Filed: May 10, 2000

(30) Foreign Application Priority Data

Apr. 7, 2000 (EP) ............................................ 00400957

(51) Int. Cl.⁷ ............................. H04B 1/69; H04B 15/00
(52) U.S. Cl. ...................... 455/63.1; 455/501; 455/506; 375/144; 375/148; 375/346; 375/349; 370/342; 370/479
(58) Field of Search ............................... 455/63.1, 67.1, 455/67.3, 501–506; 370/208, 209, 204, 252, 311, 313, 328, 335, 342, 349, 441, 479; 375/144, 148, 349, 200, 346, 348

(56) References Cited

U.S. PATENT DOCUMENTS

| 6,034,986 A | 3/2000 | Yellin ......................... 375/200 |
| 6,298,050 B1 * | 10/2001 | Van Heeswyk et al. .... 370/335 |

FOREIGN PATENT DOCUMENTS

| EP | 0 876 002 A2 | 11/1998 |
| EP | 0 980 149 A2 | 2/2000 |

OTHER PUBLICATIONS

S. Raman, L. Yue: "Simulation Results and Interference Cancellation in UMTS Downlink Receiver" First International Conference on 3G Mobile Communication Technologies, Mar. 27–29, 2000, pp. 266–270, XP002146215.

I.W. Bank, D.G.M. Cruickshank; D.I. Laurenson: "Channel Estimation for Multi–User Detector DS–CDMA Receivers" First International Conference on 3G Mobile Communication Technologies, Mar. 27–29, 2000, pp. 261–265, XP002146216.

* cited by examiner

Primary Examiner—Duc M. Nguyen
(74) Attorney, Agent, or Firm—Sughrue Mion, PLLC

(57) ABSTRACT

A receiver for a CDMA mobile radiocommunication system, receiving a signal which is a superposition of different signals, or path signals, corresponding to different propagation paths of a transmitted signal, which in turn is a superposition of different signals, or channel signals, corresponding to different channels carrying different transmitted informations, said receiver comprising, prior to the recovering of the transmitted information carried by a given channel, by exploiting said different propagation paths:

means (6, 9) for estimating at least one received channel signal, or interferer signal, which is a superposition of different path signals corresponding to different propagation paths of a transmitted channel signal corresponding to at least one channel different of said given channel, means (10) for substracting said at least one estimated interferer signal, from said received signal.

8 Claims, 3 Drawing Sheets

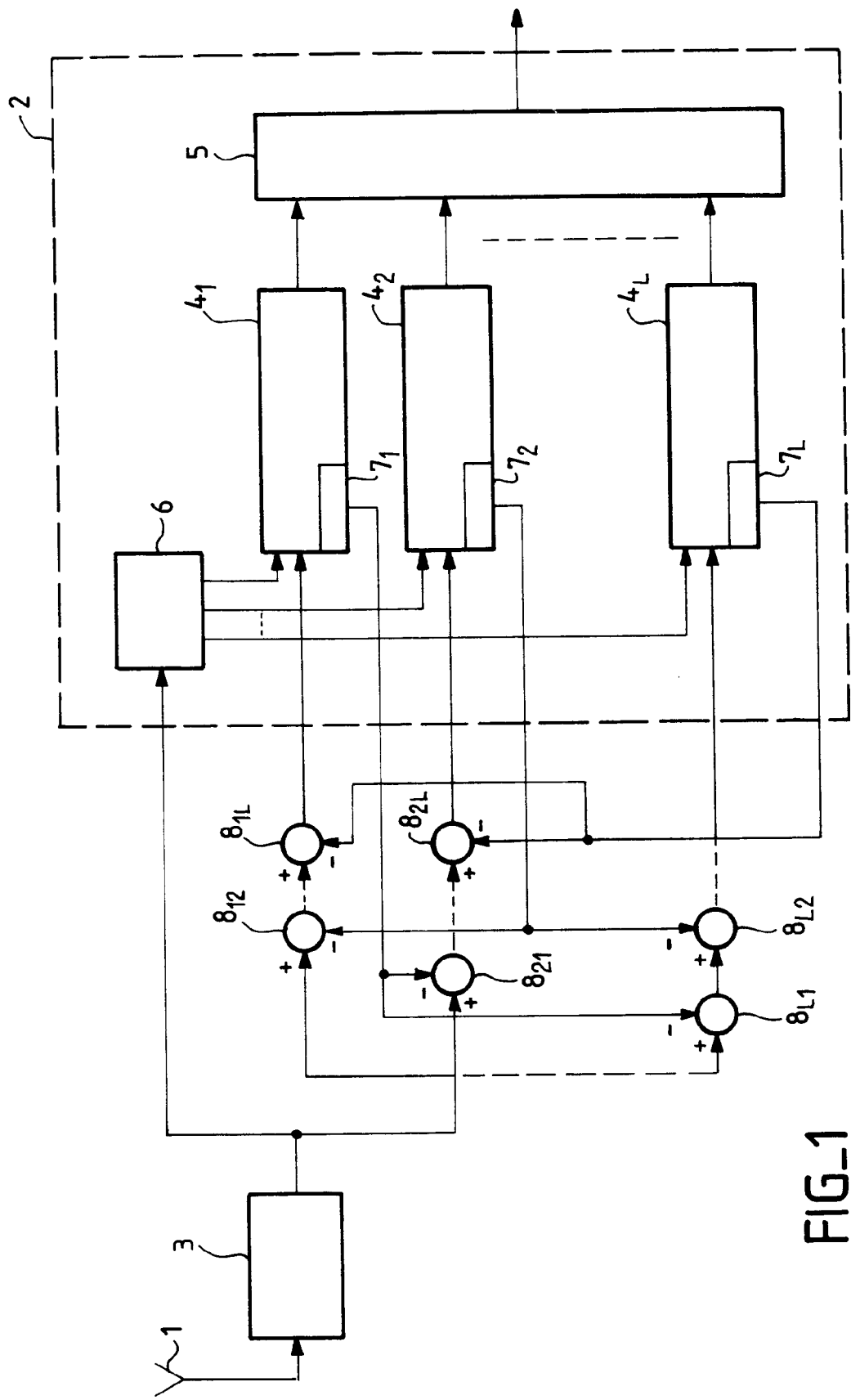
FIG_1
PRIOR ART

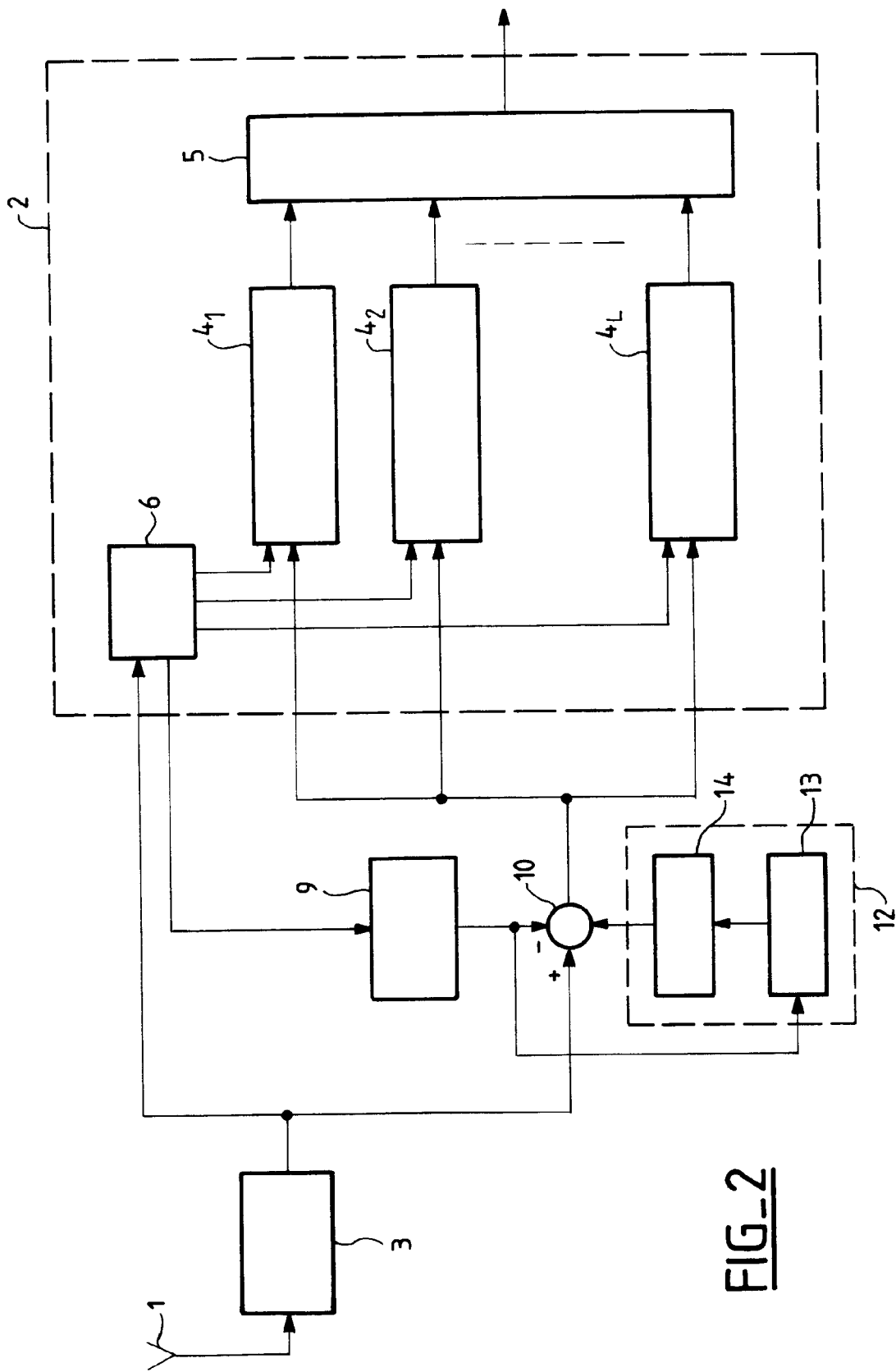
FIG_2

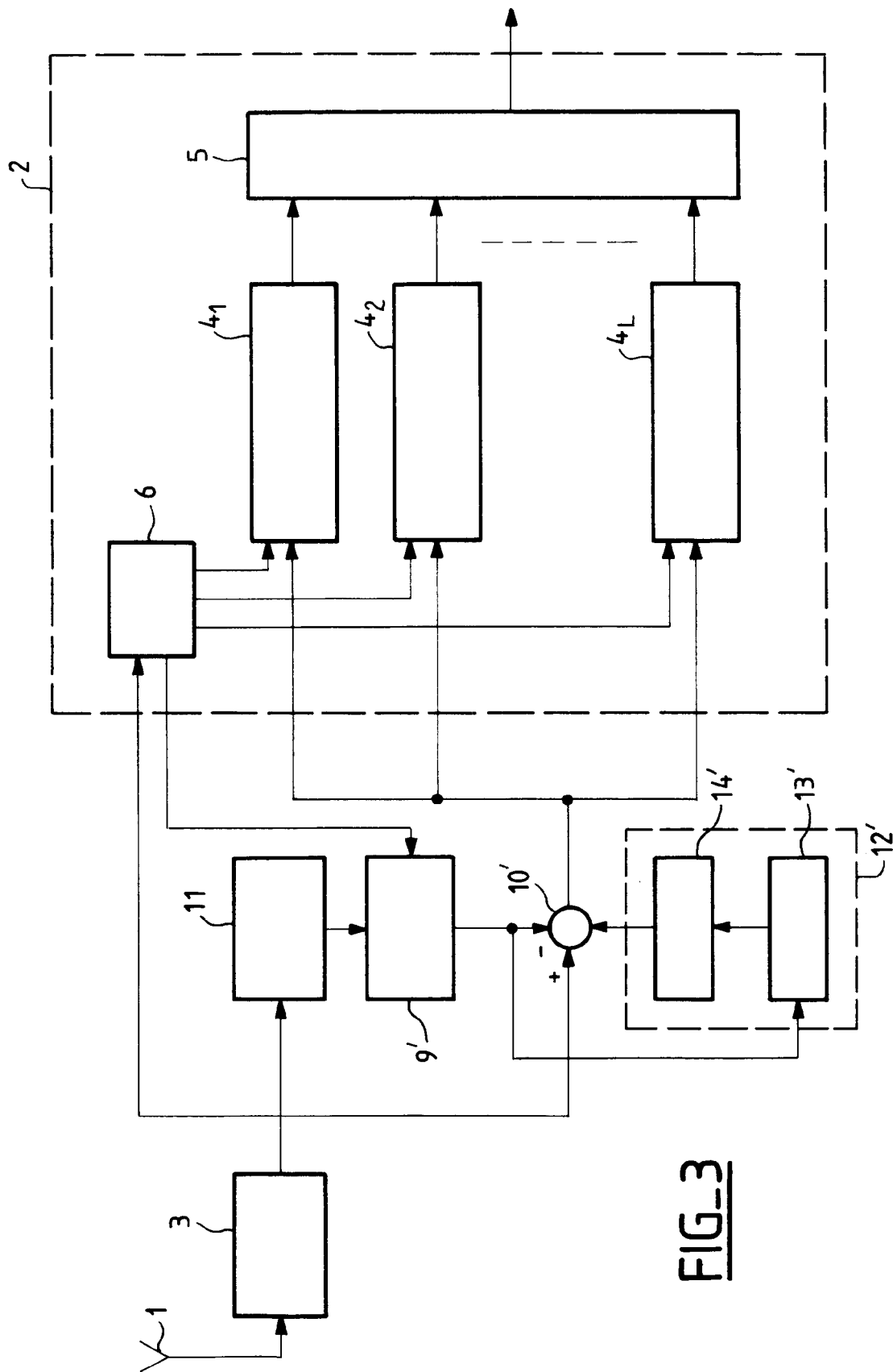

RECEIVER FOR A CDMA MOBILE RADIOCOMMUNICATION SYSTEM

BACKGROUND OF THE INVENTION

The present invention generally relates to mobile radiocommunication systems.

In mobile radiocommunication systems, there is a general requirement for higher performances, including higher quality of service and/or higher capacities. At the same time there is also a general requirement for smaller, cheaper and less power consuming equipments, in particular user equipments (or mobile stations).

Mobile radiocommunication systems generally use multiple access techniques to enable a plurality of users to share a given bandwidth, by allocating different channels to these different users.

In CDMA (Code Division Multiple Access) systems, different channels correspond to different spreading codes, each spreading code enabling to spread a signal from a basic rate to a higher rate (or chip rate), according to the known principles of spread-spectrum techniques.

As is known, CDMA systems are interference-limited systems. That means, if the interference level increases too much, then the performances (in terms of quality and/or in terms of capacity) may decrease to non acceptable values. Therefore there is a need to reduce interferences in such systems, to improve performances.

Generally, interference can be reduced by using spreading codes which are as far as possible orthogonal to each other. However, even by choosing orthogonal spreading codes, interference may still be generated when a receiver receives a received signal which is the superposition of different signals (hereinafter also called path signals) corresponding to different propagation paths of a same transmitted signal. Such different path signals may be created either non intentionaly, by reflection on various elements of the environment, or intentionaly, by use of diversity transmission techniques, i.e. by transmitting simultaneously from different network equipments, or base stations, to a same mobile station.

In CDMA systems, contrary to other multiple access systems such as for example TDMA (Time Division Multiple Access) systems, such multi-path propagation can be exploited in a receiver to improve the quality of the detected signal.

For example, in a so-called Rake receiver, different fingers or paths are provided, each finger being intended to process a given path signal, and the results provided by the different fingers then being combined in an optimal way to optimize the quality of the detected signal.

However, the signal applied to each finger is the superposition of the different path signals corresponding to the different propagation paths, and therefore the processing of a given path signal still suffers from the interference from all other path signals.

This problem is even more serious for receivers in mobile stations, i.e. for the downlink transmission direction from network to mobile stations, for the following reasons.

Besides user information intended to be transmitted between users, a mobile radiocommunication system generally requires, for the system to operate properly, that the network broadcasts some common information to all mobile stations, such as in particular for enabling the mobile stations to get synchronised with the network. A signal transmitted in downlink is therefore the superposition of different signals (hereinafter also called channel signals), corresponding to different channels (or physical channels) carrying these different types of information, and generally called, respectively, downlink physical dedicated channels and downlink physical common channels.

For example, in wideband CDMA systems like UMTS ("Universal Mobile Telecommunication System") such downlink common physical channels may include:

Physical synchronization channels (PSCH), for the mobile stations to perform frequency and/or time synchronization. In UMTS, there are two synchronization channels: primary SCH to perform slot synchronization and secondary SCH to perform frame synchronization and to identify the scrambling code group of the downlink scrambling code of the cell.

Primary common control physical channel (P-CCPCH), carrying the broadcast channel (BCH) that gives system information (number of the cell, Random access channel (RACH) scrambling code(s), . . . ).

Secondary common control physical channel (S-CCPCH), carrying the paging channel (PCH) and the forward access channel (FACH).

Primary and secondary common pilot channel (P-CPICH and S-CPICH), used for several purposes like channel estimation or handover.

Since the downlink common channels must be received by all mobile stations (or MSs) in a cell, their transmit power must be pretty large, e.g. 10% of the total transmit power of a base transceiver station (or BTS) and, moreover, they are not power controlled (i.e., their transmit power is constant).

Therefore, when a MS is close to a BTS, the interference caused on the downlink dedicated channel signal(s) of this MS, for a given path, by the downlink common channel signals from all other paths, is significant. Thus, to keep the same quality, i.e. to keep the downlink signal-to-interference ratio (SIR) close to a given target SIR, the MS will ask the BTS, via a power control loop mechanism generally provided in these systems, to increase the transmit power of its dedicated channel signal(s). This will cause an additional increase of interference for other MSs that will in turn require, via this power control loop mechanism, an increase of the BTS transmit power. For a given total transmit power this will therefore result in a loss of downlink system capacity. Thus, such interference caused by downlink common channel signals should as far as possible be avoided, or at least reduced, to improve the performance of the system.

Specific processing techniques, also called interference cancellation techniques, have been proposed for this purpose.

WO 97/08846 discloses a method for substractive multiple access interference cancellation, wherein a wireless subscriber unit receives multiple forward link signals and estimates the data being transmitted via each forward link signal. In response to these estimates an associated ideal waveform is generated for each forward link signal received. For each forward link signal processed, the ideal waveform of the other forward link signals are substracted from the signal level of that forward link signal being processed before the data carried is determined. In an alternative embodiment, the estimation of data is performed on a single channel, or sub-set of channels, carried by the forward link signals, with at least the signal level associated with a pilot channel being estimated.

EP 0 876 002 discloses a CDMA receiver which receives and demodulates a coherent CDMA signal including at least one user data channel and a separate pilot channel received over a plurality of L paths, where the desired data channel is orthogonal to the pilot channel for a given path. The CDMA receiver comprises L path demodulators, each demodulator for estimating a data channel and a pilot channel from a CDMA signal received over one of the L paths and for generating L-1 cancellation signals each to be used by a specific one of L substractor means. Each of the L substractor means is used for substracting the L-1 cancellation signals, produced by different ones of the other L-1 path demodulators, from the CDMA signal associated with substractor means. In an embodiment, the L-1 cancellation signals are reconstructed pilot signals, and each of the substractor means is located prior to its associated demodulator to substract the reconstructed pilot signals from the signal inputted to its demodulator.

Therefore these two references correspond to a same solution, wherein in each finger of the Rake receiver, the corresponding path signal of the pilot signal (or even, in the case of the first reference, the corresponding path signal of the total received signal) is estimated, and substracted from each other path signal in each other finger, prior to processing by each of these other fingers.

This solution is illustrated in FIG. 1, in a receiver classicaly including: an antenna 1, a Rake receiver 2, and some intermediate processing 3 (including RF processing, automatic gain control, reception filtering, . . . etc.) between the antenna 1 and the Rake receiver 2. The Rake receiver 2 classicaly comprises L fingers $4_1, 4_2, \ldots 4_L$ and a combiner 5, each finger being controlled in a known way by means 6 for estimating the channel impulse response of the transmission channel, which determine the amplitudes, phases, and delays, of the different propagation paths.

In this solution, interference cancellation requires L estimators $7_1, 7_2, \ldots 7_L$ for carrying out the above-mentioned estimations, and L(L-1) substractors $8_{12}, \ldots 8_{1L}, 8_{21}, \ldots 8_{2L}, \ldots 8_{L1}, 8_{L2}, \ldots$ for carrying out the above-mentioned substractions.

A drawback of this solution is that it requires a lot of signal processing and calculations, and therefore significantly increases the complexity and the power consumption of the equipments, which is not desirable, in particular for user equipments (or mobile stations).

Therefore there is a need to avoid such a drawback, while still providing an efficient interference cancellation.

Besides, in the first of the above-mentioned references, such an interference cancellation is always carried out, i.e. even if the pilot signal does not significantly interfere the useful signal (which will be the case if the mobile station is not close to a base station). This has the drawback that interference cancellation is needlessly performed in this case, which also needlessly increases power consumption of the equipments.

In the second of the above-mentioned references, the pilot signal cancellation can be switched on and off, based on a minimum mean-squared error criterion, to provide minimum mean-squared error Rake output. However such a criterion has the drawback that it involves a lot of very complex processing and calculations.

Therefore, there is also a need to avoid such a drawback, while still providing an efficient criterion to perform or not such an interference cancellation.

SUMMARY OF THE INVENTION

An object of the present invention is a receiver for a CDMA mobile radiocommunication system, receiving a signal which is a superposition of different signals, or path signals, corresponding to different propagation paths of a transmitted signal, which in turn is a superposition of different signals, or channel signals, corresponding to different channels carrying different transmitted informations, said receiver comprising, prior to the recovering of the transmitted information carried by a given channel, by exploiting said different propagation paths:

means for estimating at least one received channel signal, or interferer signal, which is a superposition of different path signals corresponding to different propagation paths of a transmitted channel signal corresponding to at least one channel different of said given channel, means for substracting said at least one estimated interferer signal, from said received signal.

According to another object of the invention, said given channel is a downlink dedicated channel and said at least one channel different of said given channel is a downlink common channel.

According to another object of the invention, said means for estimating said at least one interferer signal include:

means for estimating the channel impulse response h(t) of the transmission channel, said means providing an estimate $\hat{h}(t)$, means for computing $c(t)*\hat{h}(t)$, where c(t) is the transmitted channel signal corresponding to said at least one channel different of said given channel, and where * is the convolution operator, said means providing an estimate $c(t)*\hat{h}(t)$ of said interferer signal.

According to another object of the invention, said means for estimating said at least one interferer signal include:

means for estimating the channel impulse response h(t) of the transmission channel, said means providing an estimate $\hat{h}(t)$, means for estimating the transmitted channel signal c(t) corresponding to said at least one channel different of said given channel, said means providing an estimate $\hat{c}(t)$, means for computing $\hat{c}(t)*\hat{h}(t)$, where * is the convolution operator, said means providing an estimate $\hat{c}(t)*\hat{h}(t)$ of said interferer signal.

According to another object, said receiver further comprises:

means for controlling said means for substracting, as a function of the power of said estimated interferer signal.

According to another object, said means for controlling comprise:

means for determining the power P of said at least one estimated interferer signal, means for enabling said substraction if the following criterion is valid: $P > \alpha \cdot I$ where $\alpha$ is a predetermined parameter, and I is a reference power.

Another object of the present invention is an equipment for a CDMA mobile radiocommunication system, including a receiver of the above kind.

Another object of the present invention is a user equipment for a CDMA mobile radiocommunication system, including a receiver of the above kind.

BRIEF DESCRIPTION OF THE DRAWINGS

These and other objects of the present invention will become more apparent from the following description taken in conjunction with the accompanying drawings:

FIG. 1 is a diagram intended to illustrate a receiver according to the above-mentioned prior art, FIG. 2 is a diagram intended to illustrate an example of a receiver according to a first embodiment of the present invention, FIG. 3 is a diagram intended to illustrate an example of a receiver according to a second embodiment of the present invention.

In these diagrams, elements which can be common to these different figures will be noted in the same way.

MORE DETAILED DESCRIPTION OF THE INVENTION

According to the invention, a receiver for a CDMA mobile radiocommunication system, receiving a signal which is a superposition of different signals, or path signals, corresponding to different propagation paths of a transmitted signal, which in turn is a superposition of different signals, or channel signals, corresponding to different channels carrying different transmitted informations, essentially comprises, prior to the recovering of the transmitted information carried by a given channel, by exploiting said different propagation paths:

means for estimating at least one received channel signal, or interferer signal, which is a superposition of different path signals corresponding to different propagation paths of a transmitted channel signal corresponding to at least one channel different of said given channel, means for substracting said at least one estimated interferer signal, from said received signal.

The present invention may also be described in the following way.

The signal received at a receiver, after reception filtering, can generally be written:

$$r(t)=s(t)*h(t)+c(t)* h(t)+b(t)$$

where:

s(t) is the useful signal, or transmitted channel signal corresponding to said given channel carrying the transmitted information to be recovered (in the considered examples, a downlink dedicated physical channel), c(t) is the transmitted channel signal corresponding to said at least one channel different of said given channel (in the considered examples, a downlink common physical channel),

* is the convolution operator, h(t) is the channel impulse response of the transmission channel, including the contribution of transmission and reception filters, c(t)*h(t) is the received channel signal, or interferer signal, corresponding to the transmitted channel signal c(t), b(t) represents the noise and other interferer signals.

In a first embodiment, said at least one interferer signal is that corresponding to at least one downlink common channel that carries information that is known by the receiver, e.g., in UMTS, primary synchronization channel (P-SCH) or pilot channel (CPICH).

In this first embodiment, and as illustrated in the example of FIG. 2, the present invention uses:

means 6 for estimating the channel impulse response h(t) of the transmission channel, said means providing an estimate ĥ(t), means 9 for computing c(t)*ĥ(t), where c(t) is the transmitted channel signal corresponding to said at least one channel different of said given channel, and where * is the convolution operator, said means providing an estimate c(t)*ĥ(t) of said interferer signal, means 10 for computing r'(t)=r(t)−c(t)*ĥ(t).

It is noted that means 6 for estimating the channel impulse response are the ones already needed for controlling the fingers $4_1, 4_2, \ldots 4_L$ of the Rake receiver 2; therefore this does not involve any additional complexity for the receiver.

In UMTS for example, such a channel impulse response estimation is preferably performed using the CPICH since the corresponding channel signal is received with a large power (however channel estimation can also be performed with other channels such as the DPCCH (Dedicated physical control channel) for example). The channel impulse response is then usually estimated under the form $$\hat{h}(t) = \sum_{p=0}^{N_p-1} \hat{a}_p p(t - \hat{\tau}_p)$$

where p(t) includes the contribution of all transmission and reception filters and is normalized so that its energy be 1, $\hat{a}_p$ is the complex amplitude of the p-th path, and $\hat{\tau}_p$ is the delay of the p-th path.

If the power of the considered interferer signal is large, which is the case when the mobile station is close to a base station, the channel impulse response estimate ĥ(t) is nearly equal to the channel impulse response h(t) and thus the signal r'(t) can be written:

$$r'(t) \approx s(t)*h(t)+b(t).$$

The useful signal s(t) can then be estimated from the signal r'(t) by processing this signal in a conventional way, in the Rake receiver 2 or in any other processing means.

In systems such as UMTS for example, where the transmitted signals are structured in frames, in turn structured in time-slots, the above-mentioned operations are preferably performed slot by slot. Indeed, certain information such as power control bits, enabling to perform power control, need to be recovered slot per slot (and not on a longer period basis).

In this first embodiment, the signal c(t) is considered to be known by the receiver. For the CPICH for instance, c(t) includes the spreading and scrambling and could be expressed in each slot as:

$$c(t) = \sum_{n=0}^{N-1} d_n \sum_q^Q c_q^{(ch)} c_{q+nQ}^{(scramb)} \delta(t - (q + nQ)T_c)$$

where N is the number of symbols per slot, $(d_0, \ldots, d_{N-1})$ are the N symbols of this slot, $c^{(ch)}$ is the channelization code of length Q (where Q is the spreading factor), $c^{(scramb)}$ is the complex scrambling code used in this slot, $T_c$ is the chip period, and δ(t) is the dirac function (δ(t)=1 if t=0, δ(t)=0 otherwise).

In a second embodiment, said at least one interferer signal is that corresponding to at least one downlink common channel that carries information that is not known by the receiver.

In this second embodiment, and as illustrated in the example of FIG. 3, the invention uses:

means 6 for estimating the channel impulse response h(t) of the transmission channel, said means providing an estimate ĥ(t), means 11 for estimating the transmitted channel signal c(t) corresponding to said at least one channel different of said given channel, said means providing an estimate ĉ(t), means 9' for computing $\hat{c}(t)*\hat{h}(t)$, where * is the convolution operator, said means providing an estimate $\hat{c}(t)*\hat{h}(t)$ of said interferer signal, means 10' for computing $r'(t)=r(t)-\hat{c}(t)*\hat{h}(t)$.

Therefore the difference compared to FIG. 2 is that the signal c(t), which is not known by the receiver, has to be estimated.

Means 11 for estimating the signal c(t) can use any conventional processing technique, such as the Rake receiver technique or any other processing technique, for recovering the information carried by said at least downlink common channel, from the received signal r(t), and then any conventional technique for re-constructing a signal c(t) from the thus recovered information.

The solution according to the invention can be used to remove the interference due to one or several downlink common channels from the received signal. If the interference from several downlink common channels is to be removed, the operations of estimation of the channel impulse response and of convolution by the estimated channel impulse response can be performed in a single step for these different downlink common channels (and not in one step per downlink common channel). Thus, it only adds negligible complexity to remove all the known downlink common channels rather than only one.

Interference cancellation according to the present invention can be always used, i.e. even if said at least one interferer signal is not well received (and thus does not interfere significantly the useful signal): in this case, it will not improve the performance but will not degrade them either.

However, in order to decrease the power consumption of the receiver (in particular of a MS receiver), it can be done only when really needed.

Besides, to decrease the complexity of the receiver (in particular a MS receiver), the criterion to perform or not said interference cancellation is advantageously based on the power P of said at least one estimated interferer signal.

For example, interference cancellation can be performed only when the following criterion is valid:

$P > \alpha I$ where $\alpha$ is a predetermined parameter, and I is a reference power which may be for example the estimated total interference power, or the total power of the received signal (which can be determined according to any known technique).

The power P of the estimated interferer signal can also be determined according to any known technique.

For example, in UMTS, for the case where the interferer signal corresponds to the downlink common physical channel CPICH, the power $P_{CPICH}$ can be computed from the estimated channel impulse response $\hat{h}(t)$ as:

$P_{CPICH} = \int |\hat{h}(t)|^2 dt$

In practice, the integral is replaced with a discrete summation.

In UMTS, the channel impulse response is usually estimated under the form $$\hat{h}(t) = \sum_{p=0}^{N_p-1} \hat{a}_p p(t - \hat{\tau}_p)$$

where p(t) includes the contribution of all transmission and reception filters and is normalized so that its energy be 1, $\hat{a}_p$ is the complex amplitude of the p-th path, and $\hat{\tau}_p$ is the delay of the p-th path. In this case, $$P_{CPICH} = \sum_{p=0}^{N_p-1} |a_p|^2.$$

Therefore, as illustrated in the examples of FIG. 2, or 3, a receiver may further comprise:

means 12, or 12', for controlling said means for substracting (10, or 10'), as a function of the power of said estimated interferer signal.

Besides, in the illustrated examples, means 12, or 12', comprise:

means 13, or 13', for determining the power P of said at least one estimated interferer signal, means 14, or 14', for enabling said substraction if the following criterion is valid:

$P > \alpha I$ where $\alpha$ is a predetermined parameter, and I is a reference power, which may be for example the estimated total interference power, or the total power of the received signal.

It should be noted that such a criterion may apply to any type of interference cancellation, not only the one according to the present invention.

It should also be noted that in the example disclosed h(t) does not only include the channel impulse response of the transmission channel, but also the contribution of transmission and reception filters, as well as the transmit power of the signal c(t) (if several signals are transmitted, h(t) is normalized with respect to the power of one of the transmitted signals, which is the CPICH in the considered example). Indeed, in this example, c(t) represents the transmitted signal before the transmission filter and the power amplifier. More generally c(t) could be multiplied by any given factor and h(t) simultaneously divided by the same factor, provided that c(t)*h(t) is unchanged.

Besides, generally, computation of c(t)*h(t) is performed in a digital way, i.e. on a sampled signal (and not an a continuous signal). Therefore the computation is performed on the samples of the transmitted signal, the signal generally being sampled every $T_c/e$ where $T_c$ is the chip period and e is the oversampling factor (e being an integer).

What is claimed is:

1. A receiver for a CDMA mobile radiocommunication system for receiving a signal which is a superposition of different signals, path signals corresponding to different propagation paths of a transmitted signal which is a superposition of different signals, or channel signals corresponding to different channels carrying different transmitted information, said receiver comprising, prior to the recovering of the transmitted information carried by a given channel, by exploiting said different propagation paths:

means for estimating at least one received channel signal, or interferer signal, which is a superposition of different path signals corresponding to different propagation paths of a transmitted channel signal corresponding to at least one channel different of said given channel; and means for removing said at least one estimated interferer signal from said received signal.

2. A receiver according to claim 1, wherein said given channel is a downlink dedicated channel and said at least one channel different of said given channel is a downlink common channel.

3. A receiver according to claim 1, wherein said means for estimating said at least one interferer signal comprises:

means for estimating the channel impulse response $\hat{h}(t)$ of the transmission channel, said means providing an estimate $\hat{h}(t)$, and means for computing $c(t)*\hat{h}(t)$, where $c(t)$ is the transmitted channel signal corresponding to said at least one channel different of said given channel, and where * is the convolution operator, said means providing an estimate $c(t)*\hat{h}(t)$ of said interferer signal.

4. A receiver according to claim 1, wherein said means for estimating said at least one received channel signal comprises:

means for estimating the channel impulse response $h(t)$ of the transmission channel, said means providing an estimate $\hat{h}(t)$, means for estimating the transmitted channel signal $c(t)$ corresponding to said at least one channel different of said given channel, said means providing an estimate $\hat{c}(t)$, and means for computing $\hat{c}(t)*\hat{h}(t)$, where * is the convolution operator, said means providing an estimate $\hat{c}(t)*\hat{h}(t)$ of said interferer signal.

5. A receiver according to claim 1, further comprising:

means for controlling said means for removing said at least one estimated interferer signal as a function of the power of said estimated interferer signal.

6. A receiver according to claim 5, wherein said means for controlling comprise:

means for determining the power P of said at least one estimated interferer signal, and means for enabling said removing said at least one estimated interferer signal if the following criterion is valid:

$$P > \alpha I$$

where $\alpha$ is a predetermined parameter, and I is a reference power.

7. An equipment for a CDMA mobile radiocommunication system, including a receiver according to claim 1.

8. A user equipment for a CDMA mobile radiocommunication system, including a receiver according to claim 1.

* * * * *